April 12, 1966   M. A. MICHALSKI   3,246,201
PULSE DISCHARGE LAMP CIRCUIT SUPERVISION
Filed Aug. 4, 1961
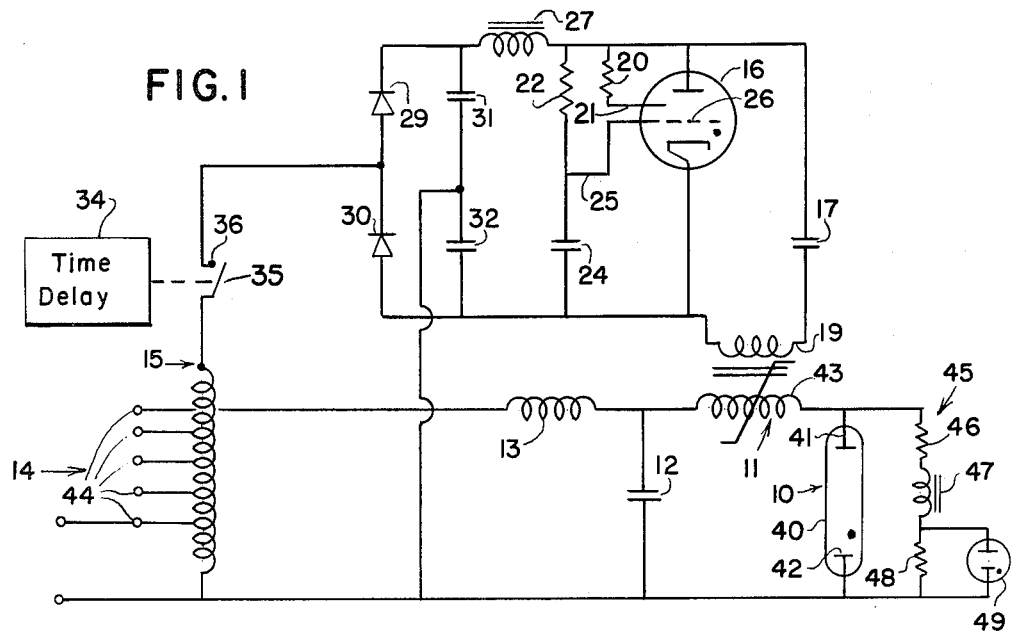
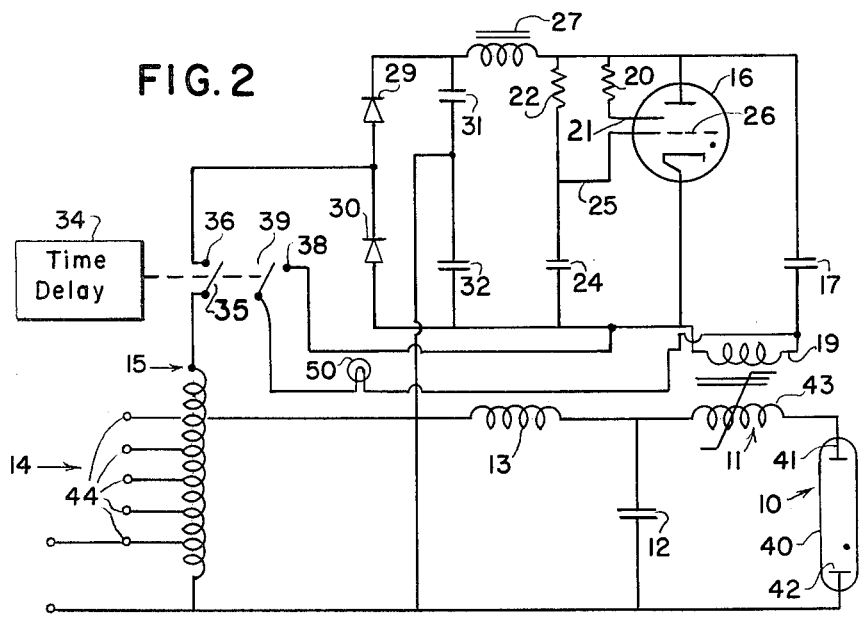
*INVENTOR.*
Maksymilian Michalski
by Edward J. Connors
ATTORNEY.

United States Patent Office 3,246,201
Patented Apr. 12, 1966

3,246,201
PULSE DISCHARGE LAMP CIRCUIT
SUPERVISION
Maksymilian A. Michalski, Woodside, N.Y., assignor, by mesne assignments, to Berkey Photo, Inc., New York, N.Y., a corporation of Delaware
Filed Aug. 4, 1961, Ser. No. 129,427
2 Claims. (Cl. 315—120)

The present invention relates to a circuit for an electric discharge lamp of the type using a pulsed waveform, and more particularly to a starting circuit including means indicating the failure of the lamp to light.

The discharge lamp is an elongated quartz tube having self-heating electrodes at opposite ends, and contains an inert rare gas such as xenon at a pressure of not exceeding atmospheric. In order that the lamp have a high light output in proportion to its energy input, it is supplied with alternating current through a saturable reactor in series with the lamp, which results in a high instantaneous loading of the lamp. The saturable reactor includes a high permeability high saturation flux density magnetic core material having a generally rectangular hysteresis loop characteristic. Below saturation a low magnetizing current flows through the lamp to continue ionization thereof between high current pulses, and thus the high current pulses may be supplied at the same voltage as that necessary to maintain conduction through the lamp.

The discharge through the lamp is initiated by applying a pulse superimposed upon the voltage applied to the terminals of the lamp such as by the use of an auxiliary winding on the saturable reactor. The pulse may be produced by a circuit connected to the alternating current supply and including a small saturable reactor in series with the supply to the auxiliary winding. A low turn ratio is used in the auxiliary winding so that there is a large step up in the voltage of the starting pulse.

Alternatively, the discharge through the lamp may be initiated by imposing high frequency damped oscillations on the auxiliary winding of the saturable reactor. The high frequency is of the order of one megacycle, the damped oscillatory pulses occurring at the rate of from two to ten for each cycle of the operating frequency, and thus produce one or more pulses of damped oscillations at or near the peak of each cycle of the supply voltage. Such a system is described in a copending application Serial No. 45,195, filed July 25, 1960, abandoned, and wherein the inventor hereof is one of the co-inventors.

Occasionally the discharge lamp may fail to light upon energization of its circuit. In the event such a lamp is connected in a set-up with a plurality of such lamps, the operator may not notice the failure to light until an inspection is later made of the completed work and thus much valuable time and material may be wasted. The present invention aims to overcome this disadvantage by providing means for a visible or audible warning of the failure of the lamp to light.

In accordance with the present invention means are provided to sense the voltage across the discharge lamp and apply the sensed information to circuit means to warn the operator of the failure of the lamp to light.

Other objects and advantages of the invention will be apparent from the following description and from the accompanying drawing which shows, by way of example, two embodiments of the invention.

In the drawings:

FIGURE 1 is a diagrammatic circuit of a discharge lamp with its starting circuit and embodying the invention.

FIGURE 2 is a somewhat modified circuit corresponding to FIGURE 1 and illustrating another embodiment of the invention.

Referring to FIGURE 1 there is shown a circuit for an electrical system in which a discharge lamp or flashtube 10 is connected in series with a saturable reactor 11 across a capacitor 12, connected in turn in series with a current limiting reactance or impedance 13 across an alternating current supply of generally sinusoidal wave form through a variable tap auto transformer 14 having an end tap 15.

A starting circuit includes a cold cathode tube 16 connected across a triggering capacitor 17 in series with an auxiliary winding 19 of the saturable reactor 11. A keep-alive resistance 20 is connected to a first grid 21 of the thyratron 16, and a R-C circuit including a resistor 22 in series with a capacitor 24 has its mid-point 25 connected to a second grid of the thyratron 16. The current input to the starting circuit is limited by a series resistance or impedance 27. A power supply is provided by selenium rectifiers 29 and 30 connected to capacitors 31 and 32 in a voltage doubling circuit. The supply for the voltage doubling circuit is taken from end tap 15 so that about 350 volts is provided. A time delay mechanism 34 operates a switch 35 having a contact 36 connected in the power supply so that the starting circuit is disconnected at the end of a starting interval of predetermined length.

The discharge lamp 10 is formed of an elongated quartz envelope 40 containing an inert rare gas of relatively high atomic weight such as xenon at a pressure not exceeding atmospheric. A pair of self-heating electrodes 41 and 42 are provided at opposite ends of the tube 40.

The saturable reactor 11 is formed of a core of grain oriented silicon steel with a winding thereon. The saturable reactor is so designed and proportioned with respect to the capacitor 12, as is well known in the art, that the saturable reactor reaches saturation during every half cycle of the supply to energize the discharge lamp with high current pulses and to provide a residual current to maintain ionization of the lamp between the pulses.

The current limiting reactance or impedance 13 is a non-saturable reactor of appropriate impedance. Alternatively, a resistance might be used instead of the reactor, however, the efficiency of the system would be less. The auto transformer 14 is provided with a plurality of taps 44 for connection to systems varying between 200 and 250 volts, it being preferable to provide an output of about 250 volts.

In accordance with the invention, means are provided to sense the voltage across the discharge lamp and apply the sensed information to circuit means to warn of the failure of the lamp to light. In the embodiment of FIGURE 1, the voltage sensing and warning means includes a network 45 including a resistance 46, an inductance 47, and a resistance 48 across which is connected indicating means such as a neon lamp 49. While a preferred circuit employs two resistances and an inductance with the neon lamp connected across one resistance, it is obvious that by appropriate selection of circuit constants a single resistor and inductance might be used. Alternatively, the neon lamp might be omitted and a relay operated audible signal might be used. The network 45 is connected across the terminals 41 and 42 of the discharge lamp 40.

In the embodiment of FIGURE 2 like numerals are used to indicate the circuit elements common to FIGURE 1. In FIGURE 2 the voltage sensing and warning means includes a visual warning incandescent lamp 50 connected across the auxiliary winding 19 of the saturable reactor 11 in series with a contact 38 of a switch 39 operated by the time delay mechanism 34. As in the circuit of FIGURE 1, an audible warning means might be substituted for the visual warning light 50. Still further, if desired, other forms of visual warning lamps might be substituted for the neon lamp 49 or for the incandescent lamp 50.

In the operation of the electric system as shown in both FIGURES 1 and 2, it is connected to a source of alternating current, potential being applied across electrodes 41 and 42 of the discharge lamp 10. Inasmuch as the discharge lamp inherently has a characteristic such that its starting voltage is greater than the operating voltage, the lamp will not flash over until the ionization of its gas is initiated by triggering pulses from the starting circuit. The alternating current is rectified and applied across the R-C circuit 22-24. The frequency of oscillation of this circuit may be varied by appropriate selection of the values of the resistance and capacitance as is well known in the art. The R-C circuit 22-24 initiates discharges of the cold cathode tube 16 into the capacitor 17 and winding 19 at a pulse rate of between approximately 120 and 600 pulses per second. These discharges are pulses of high frequency damped oscillations superimposed upon the supply voltage at the electrodes of the discharge lamp, and because of the turn ratio of the winding 19 with respect to that of the main winding 43 of the saturable reactor 11, a greatly increased peaked starting voltage is applied to the electrodes 41 and 42, resulting in ionization of the gas and the flashing of the discharge lamp by the alternating potential supplied in series with the winding 44.

In the operation of the embodiment of FIGURE 1, upon the application of the high frequency starting pulses to the discharge lamp 10, the passage thereof to the visual warning lamp 49 is blocked by the reactor 47. In the event the lamp 10 does not fire, the voltage across its terminals remains above the amount required to cause the warning lamp 49 to light and an indication of the failure of the lamp 10 to light is given by the illumination of the warning lamp 49. However, in the event the lamp 10 is lighted, the voltage drop across its terminals is sufficient so that the warning lamp 49 will not light.

In the operation of the embodiment of FIGURE 2, upon the actuation of the time delay mechanism 34 at the end of the starting interval, the switch 38 is closed thus applying the potential of the auxiliary winding to the lamp 50. In the event the discharge lamp 10 fails to light there is no current through the saturable reactor 11 and no induced voltage in the auxiliary winding 19. Thus, in this embodiment the failure to light is signalled by the absence of an indicating light.

A system manufactured commercially and found to operate satisfactorily employs constants for the various circuit elements as follows: The size of capacitor 12 in combination with the supply voltage determines the loading or watt input to the discharge lamp 10. For a 2000 watt discharge lamp 10, and a voltage of 250 volts 60 cycle A.C., a suitable value for capacitor 12 is 84 mfd. in which event the current limiting impedance 13 may be about 50 millihenries. The saturable reactor 11 includes a main winding 44 of about 200 turns of No. 9 square wire wound on matching V-shaped core sections of grain oriented silicon steel, the core having approximate cross-sectional dimensions of 2" in width by 1" in thickness, the window of the core being about 4" by 1". The cold cathode thyratron 16 is an OA-5. The triggering capacitor 17 is 0.5 mfd. The winding 19 being such as to produce between 5 and 10 thousand volts peak across the electrodes 41 and 42. The keep-alive resistor 20 is 10 megohms, resistor 22 is 5 megohms and the capacitor 24 is 0.001 mfd. The current limiting choke 27 is between 3 and 5 henries. The capacitors 31 and 32 of the power supply are 2.0 mfd. each. The rectifiers 29 and 30 are selenium. The resistor 46 is 244K ohms, and inductance 47 is 20 henries, the resistor 48 is 24K ohms, and the neon lamp 49 may be one-twenty-fifth watt. The incandescent lamp 50 may be 6 volts.

While the invention has been described and illustrated with reference to specific embodiments thereof, it will be understood that other embodiments may be resorted to without departing from the invention. Therefore, the form of the invention set out above should be considered as illustrative and not as limiting the scope of the following claims.

I claim:

1. An electric system comprising a xenon filled electric discharge lamp, means to initiate discharge of the discharge lamp, a saturable reactor in series with the discharge lamp, an auxiliary winding on the saturable reactor, an indicating lamp, and a switch operative to render ineffective the means to initiate discharge of the discharge lamp and to connect the indicating lamp in parallel with the auxiliary winding, the indicating lamp operative while current is being drawn by the discharge lamp and thereby indicating its lighted condition.

2. An electric system comprising a source of electric current, a xenon filled electric discharge lamp, a current limiting impedance and a saturable reactor connected in series with the discharge lamp across said electric current source, an auxiliary winding for the saturable reactor, means to initiate discharge of the discharge lamp connected across the auxiliary winding, and an indicating lamp connected in current receiving relationship with a portion of said circuit connected across said source and providing an indication as to current flow in said circuit.

References Cited by the Examiner

UNITED STATES PATENTS

| 2,076,278 | 4/1937 | Ryde et al. | 315—100 |
| 2,078,363 | 4/1937 | Bareiss | 315—136 |
| 2,504,498 | 4/1950 | Clack et al. | 315—100 |
| 2,938,149 | 5/1960 | Wiley | 315—100 |
| 3,090,892 | 5/1963 | Mekelburg | 315—129 |

FOREIGN PATENTS 874,841   8/1961   Great Britain.

JOHN W. HUCKERT, *Primary Examiner.*
GEORGE N. WESTBY, DAVID J. GALVIN,
*Examiners.*